(12) United States Patent
Ripley et al.

(10) Patent No.: US 9,181,611 B2
(45) Date of Patent: Nov. 10, 2015

(54) CONTROL OF MICROSTRUCTURE IN SOLDERED, BRAZED, WELDED, PLATED, CAST OR VAPOR DEPOSITED MANUFACTURED COMPONENTS

(75) Inventors: Edward B. Ripley, Knoxville, TN (US); Russell L. Hallman, Knoxville, TN (US)

(73) Assignee: Consolidated Nuclear Security, LLC, Reston, VA (US)

( * ) Notice: Subject to any disclaimer, the term of this patent is extended or adjusted under 35 U.S.C. 154(b) by 306 days.

(21) Appl. No.: 13/215,919

(22) Filed: Aug. 23, 2011

(65) Prior Publication Data

US 2012/0042993 A1 Feb. 23, 2012

Related U.S. Application Data

(60) Provisional application No. 61/376,028, filed on Aug. 23, 2010.

(51) Int. Cl.
*C22F 1/00* (2006.01)
*C22F 3/00* (2006.01)
*C21D 9/00* (2006.01)
*C22F 3/02* (2006.01)

(52) U.S. Cl.
CPC ... *C22F 3/00* (2013.01); *C21D 9/00* (2013.01); *C22F 1/00* (2013.01); *C22F 3/02* (2013.01); *B23K 2203/10* (2013.01)

(58) Field of Classification Search
CPC ........ B23K 2203/10; C21D 9/00; C21D 1/04; C22F 3/02; C22F 3/00; C22F 1/00; B22D 27/02; B22D 39/003; B22D 18/04; B22D 19/00

USPC .......... 266/233, 234, 237, 200, 249; 228/101; 205/89; 427/598; 164/496; 75/10.16, 75/10.67; 148/513
See application file for complete search history.

(56) References Cited

U.S. PATENT DOCUMENTS

| | | | |
|---|---|---|---|
| 3,619,866 A * | 11/1971 | Hofmann et al. | 425/3 |
| 3,947,533 A * | 3/1976 | Davis | 264/437 |
| 5,795,631 A | 8/1998 | Parkansky et al. | |
| 6,210,495 B1 * | 4/2001 | Legrand et al. | 148/301 |
| 6,346,181 B1 * | 2/2002 | Lee et al. | 205/89 |
| 2006/0096732 A1 * | 5/2006 | Miwa et al. | 164/48 |
| 2006/0131300 A1 | 6/2006 | Yablochnikov | |

FOREIGN PATENT DOCUMENTS

| | | |
|---|---|---|
| FR | 2671564 A1 | 7/1992 |
| WO | 20090082238 A2 | 7/2009 |
| WO | 20090143173 A2 | 11/2009 |

* cited by examiner

*Primary Examiner* — Scott Kastler
*Assistant Examiner* — Michael Aboagye
(74) *Attorney, Agent, or Firm* — Michael J. Renner, Esq.; Luedeka Neely Group, P.C.

(57) ABSTRACT

Disclosed are methods and systems for controlling of the microstructures of a soldered, brazed, welded, plated, cast, or vapor deposited manufactured component. The systems typically use relatively weak magnetic fields of either constant or varying flux to affect material properties within a manufactured component, typically without modifying the alloy, or changing the chemical composition of materials or altering the time, temperature, or transformation parameters of a manufacturing process. Such systems and processes may be used with components consisting of only materials that are conventionally characterized as be uninfluenced by magnetic forces.

13 Claims, 9 Drawing Sheets

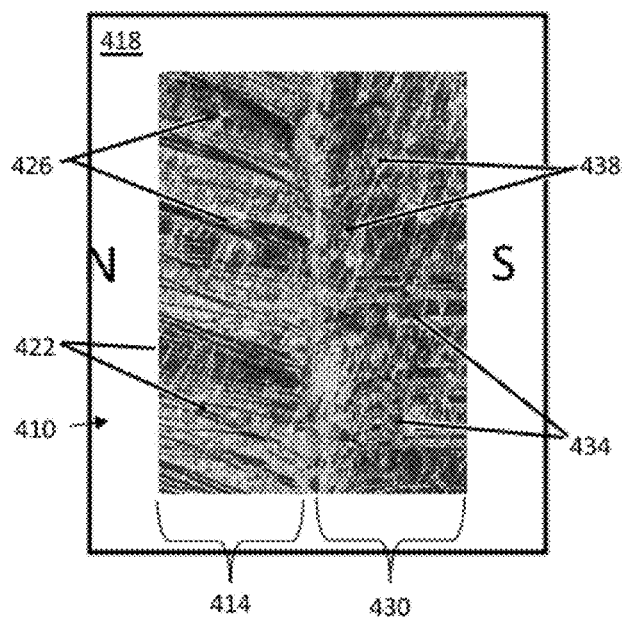
Fig. 9A
Fig. 9
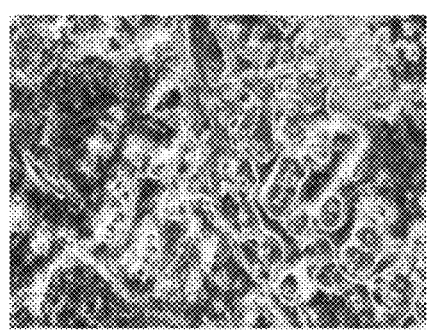
Fig. 10A
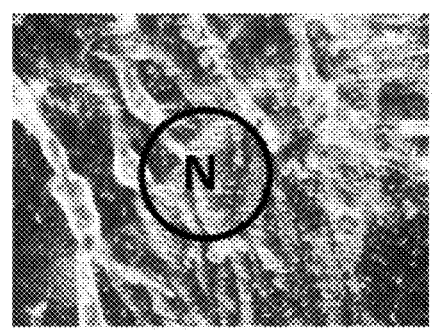
Fig. 10B

CONTROL OF MICROSTRUCTURE IN SOLDERED, BRAZED, WELDED, PLATED, CAST OR VAPOR DEPOSITED MANUFACTURED COMPONENTS

CROSS REFERENCES TO RELATED APPLICATIONS

This patent application claims priority from and is related to U.S. Provisional Patent Application Ser. No. 61/376,028 filed Aug. 23, 2010 entitled: "Control of Microstructure in Soldered, Brazed, Welded, Plated or Cast Manufactured Components."

GOVERNMENT RIGHTS

The U.S. Government has rights to this invention pursuant to contract number DE-AC05-000R22800 between the U.S. Department of Energy and Babcock & Wilcox Technical Services Y-12, LLC.

FIELD

This disclosure relates to the field of fabrication of metal parts. More particularly, this disclosure relates to processes for controlling material microstructures in fabricated metal parts.

BACKGROUND

Metallurgical processes such as soldering, welding, brazing, casting, and vapor deposition processes, which involve melting metal and then solidifying it, typically create microstructures (such as grain structures) in the resultant metal. Other metallurgical processes that do not involve melting metal, such as sintering parts using powder metallurgy, forming parts from metal that is in the mushy state, plating parts (either electrolytically or electrolessly), or vapor deposition of metals also typically create microstructures in the resultant metal. The size, orientation and morphology of the resultant microstructures generally has a significant effect on the bulk properties of the material. Often the size, orientation, and morphology of the microstructures resulting from these processes are difficult to control. What are needed therefore are improved methods for controlling the size, orientation, and morphology of microstructures resulting from these processes.

SUMMARY

The present disclosure provides a method of influencing a metallurgical property of a low magnetic response fused metal. The method typically includes a step of exposing at least a portion of the low magnetic response fused metal to a magnetic field. The present disclosure further provides a method of influencing a metallurgical property of a contiguous mass of fused metal. This method generally includes exposing at least a portion of the contiguous mass of fused metal to a relatively weak magnetic field, and the relatively weak magnetic field is the only magnetic field to which the contiguous mass of fused metal is exposed. The present disclosure further provides an apparatus for influencing a metallurgical property of a metal. Generally the apparatus has a plate with a fusing region. A low magnetic response fused metal is disposed in the fusing region. A fixture is provided for supporting the plate. A magnet is provided. The magnet is supported by the fixture and is disposed adjacent the low magnetic response fused metal. Further provided is an apparatus for influencing a metallurgical property of a metal. The apparatus generally has a plate with a fusing region for the metal. A low magnetic response fused metal may be disposed in the fusing region. There is typically a fixture for supporting the plate. A magnet is provided, and the magnet is supported by the fixture and is disposed adjacent the low magnetic response fused metal.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 9 is a photomicrograph of a cross section of a solder metal deposit formed by reflowing solder;

FIG. 9A is a magnified view of a portion of FIG. 9;

FIGS. 10A-10B are photomicrographs of cross sections of solder metal deposits formed using a soldering iron;

DETAILED DESCRIPTION

Figure 1:
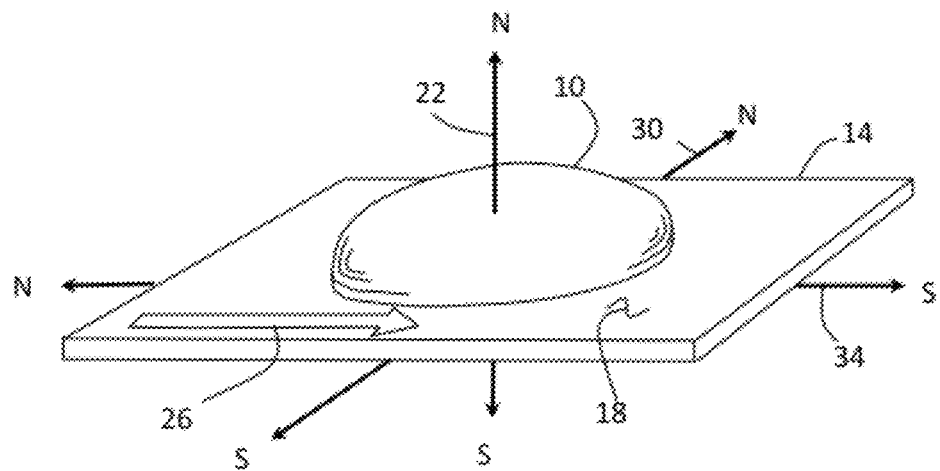
FIGS. 1-4 are somewhat schematic depictions of a metal deposit under the influence of different magnetic fields.

In the following detailed description of the preferred and other embodiments, reference is made to the accompanying figures which form a part hereof, and within which are shown by way of illustration the practice of specific embodiments of materials and processes for use in the fabrication of soldered, brazed, welded, plated, vapor-deposited, cast, powder metal components, components fabricated from metal that is in a mushy state, electro-plated components and electrolessly plated components. It is to be understood that other embodiments may be utilized, and that structural changes may be made and processes may vary in other embodiments.

The microstructure of a material typically has a dramatic effect on the physical and mechanical properties of the material. Many mechanical properties (such as the ability to withstand shock and vibration) of metals that are formed using such metallurgical processes as soldering, brazing, welding, plating, vapor deposition, casting, powder metallurgy (for example, during sintering), mushy metal fabrication, electrolytic plating and electroless plating may be controlled if the morphology of the microstructures, (e.g., the grain orientation, the grain size etc.) are controlled during solidification of the metal. Further, residual stresses in metal may be eliminated or redirected by controlling how a molten metal phase solidifies. Control of residual stresses reduces deformation, improves machinability, and reduces cracking in components formed with these processes. In addition, the control of grain structure may sometimes be used to solve "peculiar" problems that appear occasionally in metallurgical processes. An example of such a metallurgical property of a low magnetic response fused metal that may be influenced by a magnetic field, such as a relatively weak magnetic field, is the control of formation of "tin whiskers" in lead-free solder joints, described in more detail later herein.

Magnetic fields may be used to control various other properties of certain metals during other metallurgical processes. For example, the use of high intensity external magnetic fields may be used to control the behavior of solidification of a metal following a melting process. In other metallurgical process applications, such as magnetically levitated zone refining, a high intensity magnetic field may be applied such that a melt may be magnetically levitated while being solidified. This process may be used to obtain high-purity products by a process called "zone refining." Typically these high intensity magnetic fields are produced by electromagnets and they generally have a magnetic strength that may range from several Tesla to over 45 Tesla. The terms Gauss and Tesla are units of measure of magnet fields, where 1 Gauss=0.0001 Tesla. These magnets that produce a high intensity magnetic field typically have at least one physical dimension that is in a range from about several inches to several feet. Special handling is generally required in order to prevent equipment damage or personal injury when using such magnets. For example, it is generally necessary to provide a safety control zone surrounding such magnets in order to preclude the introduction of any material that is strongly attracted to magnetic forces, especially when such a material might be carried by a person into proximity of such a magnet. Such magnets are generally custom-made magnets and typically these magnets have a high acquisition cost. Also, large electromagnets typically have a high electrical energy consumption and may require cooling, which adds to operational costs.

A magnetic field may also be used to provide melt stirring, which is useful in generating a desired melt mixing pattern during semiconductor crystal growth, or for inducing grain refinement effects during metal casting. In these cases large magnetic fields may cause observable changes in the material microstructure.

Unexpectedly it has been found that magnetic fields may be used to affect material properties of metals that are commonly referred to as "non-magnetic metals," but which more precisely have a very small (often extremely small) magnetic response compared to ferromagnetic materials (which have a strong magnetic response). It is believed that all materials experience some effect from magnetism, although measuring it may require very sensitive instrumentation and may be very difficult. Magnetic response in materials is measured in terms of "magnetic susceptibility." When a material is placed in a magnetic field H, a magnetic moment per unit volume M is induced in the material. M is related to H by Equation 1.

$$M = kH \quad \text{(Eq'n 1)}$$

where k is the volume susceptibility. Since H and M have the same units of measure, k is dimensionless. A related parameter, magnetic molar susceptibility $c_m$ is defined by Equation 2.

$$c_m = kV_m = kM/\rho \quad \text{(Eq'n 2)}$$

where $V_m$ is the molar volume of the substance, M is the molar mass and $\rho$ is the mass density. When the cgs (centimeter-gram-second) system of units is used the customary units of measure for $c_m$ are $cm^3 mol^{-1}$ and the SI (international system) units of measurement are $m^3 mol^{-1}$. For purposes employed herein magnetic molar susceptibilities are measured at nominal room temperature (i.e., 285-300K) (except for materials designated herein as being measured at a different temperature).

The magnetic molar susceptibility of empty space is precisely 0, because there is no matter to modify an applied magnetic field.

A "diamagnetic material" is a material that is characterized as having a magnetic molar susceptibility that is slightly less than 0. Silver, copper, bismuth, and many semiconductors are diamagnetic. When a diamagnetic material is placed in a magnetic field, the external field is partially expelled and the magnetic flux density within the material is slightly reduced in comparison with the applied external magnetic field.

A "paramagnetic material" is a material that is characterized as having a magnetic molar susceptibility that is slightly greater than 0. Platinum and many of the materials used in the manufacture of electronic components are paramagnetic. When a paramagnetic material is placed in a magnetic field, the external field is partially absorbed and the magnetic flux density within the material is slightly increased compared with the applied external magnetic field. In addition, the paramagnetic material may become slightly magnetized in the direction of the external field.

"Ferromagnetic materials" such as purified iron and many other "magnetic materials" such as nickel, cobalt and gadolinium, and many alloys of these materials, have a strong magnetic response, with magnetic molar susceptibilities greater than many thousands of units. Furthermore, while the magnetic molar susceptibility of diamagnetic materials and paramagnetic materials is generally independent of the strength of the external magnetizing field, the magnetic molar susceptibility of ferromagnetic materials generally depends upon the strength of the external magnetic field. In such ferromagnetic materials, the magnetic molar susceptibility typically increases as the strength of the magnetic field increases until it reaches a maximum value, and then decreases with further increases in the strength of the external magnetic field.

Because diamagnetic and paramagnetic materials have very small magnetic molar susceptibilities it is convenient to tabulate values of $c_m$ as $c_m/10^{-6} \, cm^3-mol^{-1}$. As used herein the term "low magnetic response metal" refers to a metal having a magnetic molar susceptibility $c_m/10^{-6} \, cm^3-mol^{-1}$ that is in a range from any negative number up to +1000. As used herein a "very low magnetic response metal" refers to a metal having a magnetic molar susceptibility $c_m/10^{-6} \, cm^3-mol^{-1}$ that is in a range from any negative number up to +500.

In some embodiments of systems and methods disclosed herein for influencing the metallurgical properties of metal, the metal is a low magnetic response metal whereas in some other embodiments, the metal is a very low magnetic response metal.

Table 1 provides the magnetic molar susceptibility of certain example materials. Elements such as cobalt (which are indicated a having a "Ferro" magnetic molar susceptibility) are ferromagnetic materials, which are "off scale" for purposes of low magnetic response materials as defined herein. The values in Table 1 are taken from the CRC Handbook of Chemistry and Physics, 83$^{rd}$ edition, 2002-2003.

Even though some of the elements listed in Table 1 are not traditionally referred to as "metals," each of the elements in Table 1 that is indicated as having a Magnetic Molar Susceptibility ($c_m/10^{-6}$ cm$^3$ mole$^{-1}$) that is in a range from any negative number up to +1000 is a "low magnetic response metal" as the term is used herein. Each such element of Table 1 may be designated independently (i.e., separately from other elements in Table 1) as a "low magnetic response metal." Each of the elements in Table 1 that is indicated as having a Magnetic Molar Susceptibility ($c_m/10^{-6}$ cm$^3$ mole$^{-1}$) that is in a range from any negative number up to +500 is a "very low magnetic response metal" as the term is used herein. Each of the elements in Table 1 that is designated as having a "Ferro" Magnetic Molar Susceptibility is neither a low magnetic response metal nor a very low magnetic response metal as those terms are used herein.

TABLE 1

| Element | Magnetic Molar Susceptibility $\chi_m/10^{-6}$ cm$^3$-mol$^{-1}$ |
| --- | --- |
| Aluminum | +16.5 |
| Antimony | −99 |
| Arsenic (gray) | −5.6 |
| Arsenic (yellow) | −23.2 |
| Barium | +20.6 |
| Beryllium | −9.0 |
| Bismuth | −280.1 |
| Boron | −6.7 |
| Bromine | −56.4 |
| Cadmium | −19.7 |
| Calcium | +40 |
| Cerium (β) | +2500 |
| Cesium | +29 |
| Chromium | +167 |
| Cobalt | Ferro |
| Copper | −5.46 |
| Dysprosium (α) | +98000 |
| Erbium | +48000 |
| Europium | +30900 |
| Gadolinium (measured at 350 K) | +185000 |
| Gallium | −21.6 |
| Germanium | −11.6 |
| Gold | −28 |
| Hafnium | +71 |
| Holmium | +72900 |
| Indium | −102 |
| Iodine | −90 |
| Iridium | +25 |
| Iron | Ferro |
| Lanthanum (α) | +95.9 |
| Lead | −23 |
| Lithium | +14.2 |
| Lutetium | +182.9 |
| Magnesium | +13.1 |
| Manganese | +511 |
| Mercury (measured as a solid at 234 K | −24.1 |
| Mercury (measured as a liquid a room temp.) | −33.5 |
| Molybdenum | +72 |
| Neodymium (α) | +5930 |
| Neptunium | +575 |
| Palladium | +540 |
| Phosphorous (white) | −26.66 |
| Phosphorous (red) | −20.77 |
| Platinum | +193 |
| Plutonium | +525 |
| Potassium | +20.8 |
| Praseodymium (α) | +5530 |
| Protactinium | +277 |
| Rhenium | +67 |
| Rhodium | +102 |
| Ruthenium | +39 |
| Samarium | +1278 |
| Scandium (α) | +295.2 |
| Selenium | −25 |

TABLE 1-continued

| Element | Magnetic Molar Susceptibility $\chi_m/10^{-6}$ cm$^3$-mol$^{-1}$ |
| --- | --- |
| Silicon | −3.12 |
| Silver | −19.5 |
| Sodium | +16 |
| Strontium | +92 |
| Tantalum | +154 |
| Technetium | +115 |
| Terbium (α) | +170000 |
| Thallium | −50 |
| Thorium | +97 |
| Thulium | +24700 |
| Tin (gray) | −37.4 |
| Titanium | +151 |
| Tungsten | +53 |
| Uranium | +409 |
| Vanadium | +285 |
| Ytterbium (β) | +67 |
| Yttrium (α) | +187.7 |
| Zinc | −9.15 |
| Zirconium | +120 |

The terms "low magnetic response metal" and "very low magnetic response metal" include mixtures and alloys of any of the elements indicating in Table 1 if the resulting mixture or alloy has a magnetic molar susceptibility that is within the range defined herein for a low magnetic response metal or a very low magnetic response metal, respectively. Each such mixture of the elements and each alloy of the elements of Table 1 may be designated as a "low magnetic response metal" or a "very low magnetic response metal," respectively.

Compounds of the elements listed in Table 1 that include elements not listed in Table 1 (except for trace amounts as impurities) are not a "low magnetic response metal" or a "very low magnetic response metal" as those terms are used herein. Consequently oxides, hydroxides, and salts (chlorides, fluorides, nitrates, etc.) are not a "low magnetic response metal" or a "very low magnetic response metal" as those terms are used herein. However, solders that consist of low or very low magnetic response metals and a flux (such as a salt flux) are low or very low magnetic response metals because the flux is an impurity. Borides and silicides of the elements of Table 1 are "alloys" of those elements in the context of that term as used herein, since boron and silicon are listed in Table 1. Note that carbon is not listed in Table 1, and consequently neither carbon nor compounds of carbon (such as carbides, or polymers or organic molecules) are a "low magnetic response metal" or a "very low magnetic response metal" as those terms are used herein.

Further unexpectedly, it has been observed that a relatively weak magnetic field may have significant effects on a metallurgical property of metals that are produced by various metallurgical processes. For example, microstructures are metallurgical properties that are typically influenced by a magnetic field, and may be influenced by a relatively weak magnetic field. Grain sizes, grain morphologies, and grain orientations are examples of microstructures that are typically influenced by a magnetic field, and may be influenced by a relatively weak magnetic field. Such effects may occur even with low magnetic response metals and very low magnetic response metals.

There are three criteria used herein to define a "relatively weak magnetic field." These three criteria are independent, meaning that if a magnetic field meets any one of the criterion then the magnetic field is a relatively weak magnetic field. The first criterion used herein to define a "relatively weak magnetic field" is to define the strength (at its surface) of the magnet that is producing the magnetic field. This is the measurement (in Gauss or Tesla) that may be read by a gaussmeter at the surface of a magnet. With the first criterion, a relatively weak magnetic field refers to a field produced by a magnet that has a field strength at its surface that is in a range from 0.2 Tesla to 1.5 Tesla.

The second criterion used herein to define a relatively weak magnetic field is to define the Maximum Energy Product ($BH_{max}$) of the material that composes the magnet. B is the magnetic flux per unit area of a section of the material that is normal to the direction of flux. H is the magnetizing force that determines the ability of a magnetic body to induce a magnetic field at a given point. In the centimeter-gram-second (cgs) system of measurement, the unit of B-field is the Gauss and the unit of H-field is the Oersted. In the International System of Units ("SI"), Tesla is used for B-field and Ampere per meter (A/m) is used for H-field. $BH_{max}$ is measured (per the cgs system) in Million Gauss Oersted (MGOe). In the SI system this converts to joules/meter$^3$. $BH_{max}$ is used to define the "grade" of a magnet. For example, a grade forty (N40) magnet has a Maximum Energy Product of 40 MGOe. The higher the grade the "stronger" the magnet. With the second criterion used herein to define a relatively weak magnetic field, the magnetic field is produced by a magnet that has a maximum energy product ($BH_{max}$) that is in a range between 5 Million Gauss Oersted (MGOe) and 50 Million Gauss Oersted (MGOe). It should be noted that some magnets are fabricated from several magnetic materials. In such instances the second criterion used herein to define a relatively weak magnetic field is based on the strongest magnetic material used to fabricate the magnet.

The third criterion used herein to define "a relatively weak magnetic field" is to define the magnetic field strength at the point of application of the magnetic field to the metal being influenced by the magnetic field. This third criterion of definition encompasses comparatively stronger magnets that are disposed at a distance from the point of application. With the third criterion, a relatively weak magnetic field refers to a magnetic field that has a field strength at its point of application of the magnet field to the metal being influenced that is in a range from 0.2 Tesla to 1.5 Tesla. Typically, but not necessarily, with the third criterion used herein to define "a relatively weak magnetic field" the magnet used to produce the relatively weak magnetic field has a field strength at its surface that is less than 5 Tesla. Typically, but not necessarily, with the third criterion used herein to define "a relatively weak magnetic field" the magnet used to produce the relatively weak magnetic field has a maximum energy product ($BH_{max}$) that is less than 100 MGOe.

Magnetic forces may be applied to metals in any of various pole orientations, and multiple magnetic fields may be applied in combinations of orientations. If multiple magnetic fields (from multiple magnets) are applied in a proximity where a cumulative magnetic field exceeds the third criteria defined herein for a relatively weak magnetic field, then the magnetic field is not a relatively weak magnetic field.

In view of the three criteria used herein, the term "relatively weak magnetic field" encompasses magnetic fields produced by a magnet having a maximum strength at its surface that is typically less than 5 Tesla and generally is in the range between 0.2 to 1.5 Tesla. In further view of the three methods of definitions used herein, the term "relatively weak magnetic field" encompasses magnetic fields that is typically produced by a magnet having a maximum energy product ($BH_{max}$) that is less than 100 MGOe and that generally is in a range between 5 MGOe and 50 MGOe.

For purposes employed herein, measurements of magnetic fields are made at standard atmospheric pressure and temperature, as defined by the U.S. National Institute of Standards and Technology (NIST), namely 20° C. (293.15 K, 68° F.) and an absolute pressure of 101.325 kPa (14.696 psi, 1 atm).

Magnets that produce relatively weak magnetic fields as defined by the first and second criteria used herein to define a relatively weak magnetic material are referred to herein as "relatively weak magnets." Such magnets are found in many consumer and novelty items like magnetic catches on purses or bracelets. Such relatively weak magnets require no special care or special precautions or instructions in order to be used safely. Relatively weak magnets are typically physically small, having a maximum physical dimension that is in a range from about $\frac{1}{32}$ inch to about three inches. Typically these magnets are constructed from neodymium or an alloy of samarium and cobalt. Neodymium and samarium are characterized in the periodic table of elements as "rare earth" elements, so these magnets are often referred to as rare-earth magnets.

FIG. 1 illustrates a metal deposit 10 that is disposed on a plate 14. In the embodiment of FIG. 1 the metal deposit 10 is solder. The solder may be used to join metal parts for such purposes as sealing gaps between pipes and or tubing, forming electrical connections, and joining metal parts. While the metal deposit 10 is solder, in other embodiments a metal deposit may be a brazing metal, a welding metal, a plated metal, a cast metal, a vapor deposited metal, or a similar metal deposit.

In the embodiment of FIG. 1 the metal deposit 10 is in a fluid state by virtue of being molten metal. Molten metals are formed during soldering, welding, brazing, and casting processes. A molten metal is an example of a "fused metal." However, in addition to encompassing molten metal, the term "fused metal" as used herein also encompasses metals that are in a fluid-like state, such as powdered metal that is being sintered, and metal that is in a mushy state, and an electroplating metal (i.e., a metal being electroplated onto the surface of another material), and an electrolessly plating metal (i.e., a metal that is being electrolessly plated onto another material), and a vapor depositing metal. If a low magnetic response metal is a fused metal it is a "low magnetic response fused metal."

Various systems and methods described herein involve exposing a contiguous mass of fused metal to a magnetic field. The term "contiguous mass of fused metal" refers to a mass where all of the metal that is fused is interjoined (i.e., run together). In certain embodiments the magnetic field is a relatively weak magnetic field and the relatively weak magnetic field is the only magnetic field to which the contiguous mass of fused metal is exposed and no portion of the contiguous mass of fused metal is exposed to a magnetic field that is stronger than 1.5 Tesla. Such certain embodiments are in contrast to (and exclude) a system or process where, for example, a magnet that is stronger than a relatively weak magnet is employed such that even though a portion of the contiguous mass of fused metal is distant from the magnet and therefore exposed to a relatively low magnetic field, a portion of a contiguous mass of fused metal is close enough to the magnet to be exposed to a magnetic field that is stronger than a relatively weak magnetic field. It has been found that relatively weak magnetic fields may have different effects on fused metal than strong magnetic fields. Magnetic fields, and particularly relatively weak magnetic fields, are preferably applied to the fused metal where the fused metal is mobile.

"Mobile" refers to a condition where the molecules of the fused metal are able to behave independently in response to the magnetic field.

The plate 14 may be a circuit board, a metal substrate, a ceramic wafer, a bottom portion of a crucible or casting mold, or a similar structure. The plate 14 defines a surface plane 18. A first magnetic field 22 (indicated by North/South poles) is applied to the metal deposit 10 in a direction that is perpendicular to the surface plane 18. In the embodiment of FIG. 1 the first magnetic field 22 has the North pole oriented upward and the South pole oriented downward. In other embodiments the North pole may be oriented downward and the South pole oriented upward. Embodiments of magnetic fields, such as the first magnetic field 22 of FIG. 1, that are oriented perpendicular to a surface (such as surface plane 18) upon which a metal deposit (such as metal deposit 10) is disposed are referred to herein as "A" orientation magnetic fields, regardless of the up/down orientation of the North/South poles.

FIG. 1 also illustrates a process direction 26. The process direction 26 is a direction in which a metal melting and freezing process occurs in a direction parallel to the surface plane 18 where the metal is deposited, such as with processes involving reflow soldering, wave soldering, linear welding, and conveyor brazing. In the embodiment of FIG. 1 the process direction 26 moves parallel to the surface plane 18 in a direction from left to right.

In other embodiments the process direction 26 may move from right to left. In embodiments involving a process direction (e.g., 26) there is a metal melting and freezing direction that correspond to the process direction (e.g., 26.)

FIG. 1 further illustrates a second magnetic field 30 (indicated by North/South poles) that is oriented parallel to the surface plane 18. In the embodiment of FIG. 1 the second magnetic field 30 has the North pole oriented somewhat into the page and the South pole oriented somewhat outward from the page. In other embodiments the North pole may be oriented outward and the South pole may be oriented inward. Embodiments of magnetic fields, such as the second magnetic field 30, that are oriented parallel to the surface upon which a metal deposit is disposed and oriented perpendicular to a process direction, such as the process direction 26 of FIG. 1, are referred to herein as "B" orientation magnetic fields, regardless of the inward/outward orientation of the poles.

FIG. 1 further illustrates a third magnetic field 34 (indicated by North/South poles) that is oriented parallel to the surface plane 18. In the embodiment of FIG. 1 the third magnetic field 34 has the North pole oriented toward the left and the South pole oriented toward the right. In other embodiments the North pole may be oriented toward the right and the South pole may be oriented toward the left. Embodiments of magnetic fields, such as the third magnetic field 34, that are oriented parallel to the surface upon which a metal deposit is disposed and oriented parallel to a process direction, such as the process direction 26 of FIG. 1, are referred to herein as "C" orientation magnetic fields, regardless of the right/left orientation of the poles.

Some embodiments of methods of influencing the metallurgical properties of a low magnetic response metal that are disclosed herein do not involve a process direction such as the process direction 26 of FIG. 1. Examples of processes that typically do not involve a process direction are spot soldering, spot welding, powder metal component manufacture, electrolytic plating and electroless plating. Vapor deposition is sometimes applied using a process direction, and sometimes not. In embodiments that do not involve a process direction, the melting and freezing may occur perpendicular to the surface on which the fused metal is deposited, or the melting and freezing may occur in random directions. In embodiments that do not involve a process direction that is oriented parallel to the surface plane on which the metal is disposed, there is no distinction between the "B" and "C" orientation magnet fields.

In various embodiments, a relatively weak magnetic field may, for example, be applied as a stable field with the north/south orientation that is either in the "A" orientation or "B" orientation, or "C" orientation (a described with respect to FIG. 1). Typically the orientation "A" provides a different solder cap structure than orientation "B" or "C," and the orientation "B" typically produces a solder cap structure that is different from orientation "C" if a process direction is employed.

In the embodiment of FIG. 1 the second magnetic field 30 and the third magnetic field 34 are depicted as having their poles beneath the plate 14. In other embodiments the second magnetic field 30 and the third magnetic field 34 may have their poles above the plate 14. In the embodiment of FIG. 1 the metal deposit 10 is depicted on top of the plate 14. In other embodiments, such as reflow soldering and wave soldering, the metal deposit 10 adheres to the bottom of the plate 14, held thereby wetting and surface tension forces.

In the embodiment of FIG. 1 the entire metal deposit 10 is fused (molten). In other embodiments a portion of a metal deposit may be fused and a portion may be solid. Typically a fused portion of a metal deposit is a contiguous mass of fused metal. In some embodiments a magnetic field is applied to only a portion of the contiguous mass of fused metal. In some embodiments the magnetic field that is applied to a contiguous mass of fused metal is a relatively weak magnetic field and the relatively weak magnetic field is the only magnetic field to which the contiguous mass of fused metal is exposed. This means that no portion of the contiguous mass of fused metal experiences a magnetic field that is stronger than a relatively weak magnetic field.

Figure 2:
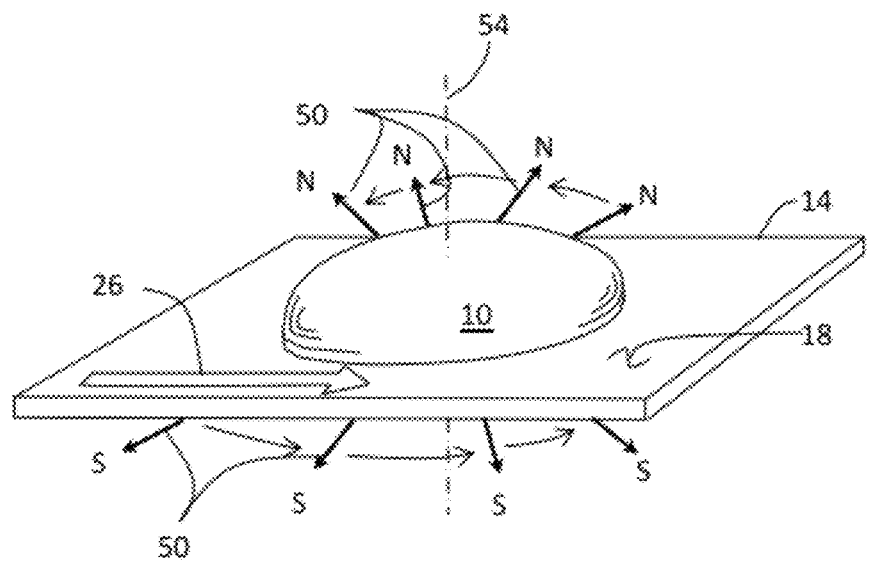

FIG. 2 illustrates a first rotating magnetic field 50, which is provided by at least one magnet that spins around a first axis 54 that is perpendicular to the surface plane 18. In the embodiment of FIG. 2 the first rotating magnetic field 50 is depicted as having its poles beneath the plate 14. In other embodiments the first rotating magnetic field 50 may have its poles above the plate 14. Embodiments of magnetic fields, such as the first rotating magnetic field 50 of FIG. 2, that rotate on a plane parallel to a surface upon which a metal deposit (such as the metal deposit 10) is disposed (such as the surface plane 18) are referred to herein as "Z" orientation magnetic fields. In some embodiments using a rotating magnetic field, such as the first rotating magnetic field 50 of FIG. 2, may employ a process direction, such as the process direction 26.

Figure 3:
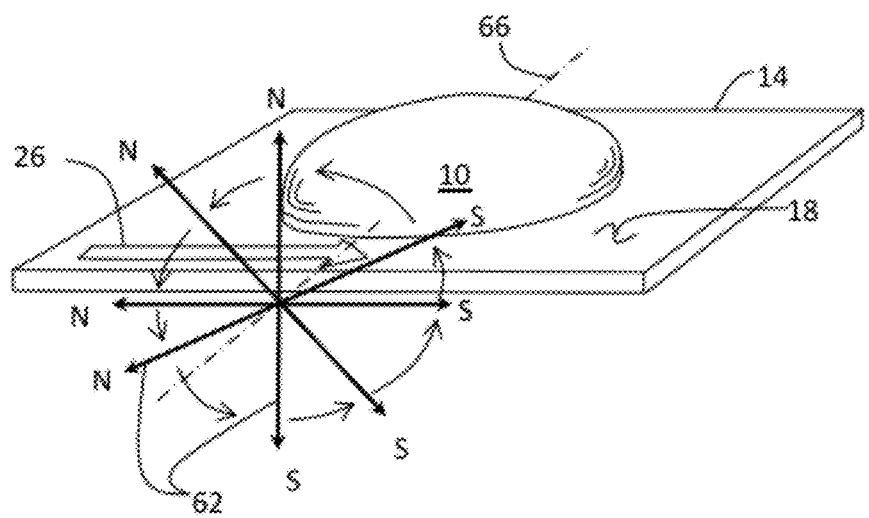

FIG. 3 illustrates a second rotating magnetic field 62, which is provided by at least one magnet that spins around a second axis 66 that is parallel to the surface plane 18. The embodiment of FIG. 3 employs the process direction 26; other embodiments may not employ the process direction 26. In the embodiment of FIG. 3 the second rotating magnetic field 62 is depicted as having its poles to one side of the plate 14, offset from the center of the metal deposit 10 and rotating parallel to the process direction 26. In other embodiments the second rotating magnetic field 62 may be offset from a different side of the plate 14 and the poles may rotate perpendicular to the process direction 26. In embodiments that do not employ the process direction 26 there is no distinction between different orientations of the second axis 66.

Figure 4:
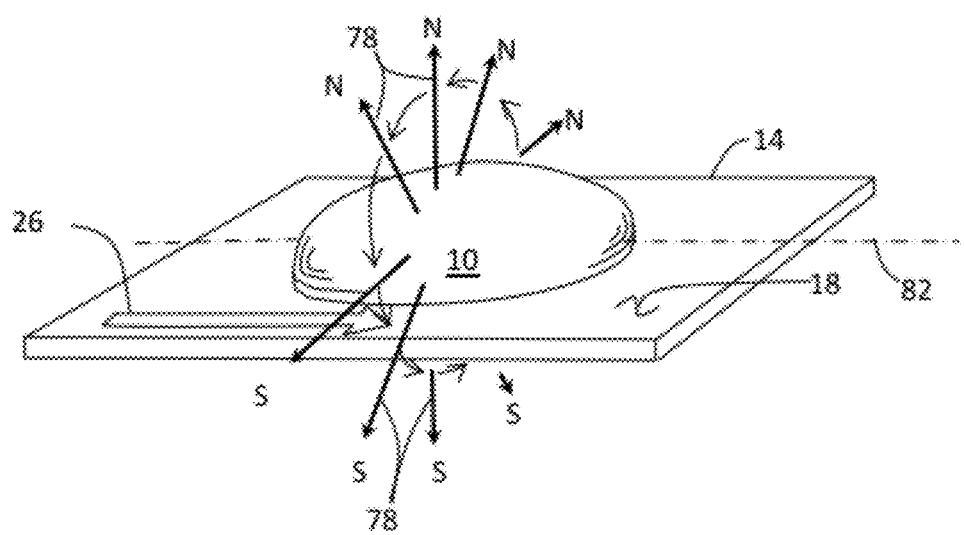

FIG. 4 illustrates a third rotating magnetic field 78, which is provided by at least one magnet that spins around a third axis 82 that is parallel to the surface plane 18. Some embodiments may employ the process direction 26. In the embodiment of FIG. 4 the third rotating magnetic field 78 is depicted as having its poles through the center of the metal deposit 10 and rotating perpendicular to the process direction. In other embodiments the third rotating magnetic field 78 may rotate parallel to the process direction 26. In embodiments that do not employ the process direction 26 there is no distinction between different orientations of the third axis 82.

It is important to note that the process direction 26 of FIGS. 1-4 and the resultant relative motions of the magnetic fields and metal deposit 10 and the plate 14 may be achieved, for example, by moving the magnetic field and holding the plate 14 stationary, or by holding the magnetic field stationary and moving the plate 14. Alternately, combinations of such movements may be employed. As used herein the term "moving magnetic field" encompasses embodiments involving any of those types of relative motion. It is also important to note that the embodiments of FIGS. 2-4 depict rotation of magnetic fields while the plate is held stationary, but in other embodiment the magnetic field may be held stationary and the plate 14 may be rotated. Alternately, combinations of such rotations may be employed. As used herein the term "rotating magnetic field" encompasses any of those types of relative rotation. A rotating magnetic field is a subset of a moving magnetic field.

Various embodiments may include a magnetic field in which the magnetic flux at a point of its application to a low magnetic response material varies as a function of time. Such fields, (referred to herein as a "variable magnetic field") may be applied in close proximity to the low magnetic response material (such as a molten solder cap) and maintained while the solder cap solidifies in the variable magnetic field. Examples of variable magnetic fields are a) a magnetic field employed in a process having a process direction, b) a magnetic field that changes in polarity over time (e.g., a field produced by an AC magnetic coil or solenoid), c) a magnetic field that varies in strength over time, either perpendicular or parallel to a surface plane (e.g., surface plane 18 of FIGS. 1-4), such as a magnetic field that may be produced by affixing a relatively weak magnet to a mechanically oscillating device, such as an ultrasonic (or a lower- or a higher-frequency) vibration tool, d) a rotating magnetic field such as magnetic fields 50 of FIG. 2, 62 of FIG. 3 and 78 of FIG. 4), and (e) an oscillating magnetic field. Parameters of a variable magnetic field that may be adjusted to affect the resulting microstructure include a) the speed of the changing field, b) the location of a metal deposit (e.g., the metal deposit 10 of FIGS. 1-4) relative to the center of motion, c) the direction of the changing field, d) the distance between the metal deposit and the magnet, and e) the strength of the magnetic field.

Processes that do not involve a variable magnetic field are referred to herein as "stable magnetic field processes." In either a stable or a variable magnetic field process, the magnetic field need only be present during the solidification of the deposited metal. Therefore, after the deposited metal has substantially solidified, the magnetic field may be removed without further significantly changing the microstructure of the deposited metal.

Certain processes described herein are characterized as relating to fused metal that is exposed to a magnetic field only from the relatively weak magnet. It should be noted that such processes do not include processes where the fused metal is exposed only to incidental and insignificant ambient magnetic fields, such as the earth's magnetic field.

The direction, stability, and strength of a relatively weak magnetic field may be controlled to affect the metallurgical properties of metals such as the grain structure, and/or strength, and/or surface morphology, and/or chemical properties. These properties are different from the same properties of the metals that are formed during solidification without a magnetic field, and these properties are generally controllable and reproducible.

Techniques disclosed herein are particularly useful in applications that employ "lead-free solder." The expanded use of lead-free solders arose in the past decade as a result of increased awareness and concern by public officials regarding the toxicity of lead. These concerns evolved into a global effort to replace lead-bearing solders with lead-free compositions. Specifically, the Restriction of Hazardous Substances (RoHS) directive was adopted in February 2003 by the European Union and became law in each member state. The RoHS directive took effect in the USA on Jul. 1, 2006. The RoHS directive restricts the use of certain hazardous substances in electrical and electronic equipment. Consequently, for example, while eutectic 60/40 lead/tin solder has been used in the electrical and electronics industries for many years, as a result of RoHS regulations, such solder has been banned from use in many parts of the world for consumer electrical and electronic systems.

The transition to "lead-free" solder has not been easy because several fundamental problems exist with most lead-free alternatives. Many of the lead-free solder compositions contain tin. Over time, solder joints formed with tin-bearing solders may grow "tin whiskers," which are electrically conductive (and typically crystalline) structures that form adjacent the surface of the solder joint and extend outward. This phenomenon is particularly prevalent in solder joints where tin, especially electroplated tin, is used as a surface finish. Tin whiskers have been observed to grow to lengths of several millimeters (mm) and in rare instances to lengths up to 10 mm. Numerous electronic system failures have been attributed to short circuits caused by tin whiskers that bridge closely-spaced circuit elements maintained at different electrical potentials. Note that tin is only one of several metals that are known to be capable of growing whiskers. Other examples of metals that may form whiskers include zinc, cadmium, indium and antimony. Controlling the formation of such whiskers in tin and in other metals are further examples of a metallurgical property of a low magnetic response fused metal that may be influenced by a magnetic field.

Preferred embodiments utilize an RoHS compliant solder such as alloys of tin and bismuth, tin and indium and copper, tin and silver, tin and silver and antimony, tin and silver and copper and antimony. An example composition of an RoHS compliant solder (known as "SAC 305") is presented in Table 2.

TABLE 2

|  | Test Method | Specification |
| --- | --- | --- |
| Ag content |  | 2.8-3.2% |
| Cu content |  | 0.3-0.7% |
| Sn content |  | Balance |
| Flux Classification | JSTD-004 | REL0 |
| Copper Mirror | IPC-TM-650 2.3.32 | No removal of copper film |
| Silver Chromate | IPC-TM-650 2.3.33 | Pass |
| Corrosion | IPC-TM-650 2.6.15 | Pass |
| SIR JSTD-004, Pattern Down | IPC-TM-650 2.6.3.3 | $2.33 \times 10^{11}$ ohms |
| SIR Bellcore (Telecordia) | Bellcore GR-78-CORE 13.1.3 | $6.12 \times 10^{11}$ ohms |
| Electromigration | Bellcore GR-78-CORE 13.1.4 | Pass |
| Post Reflow Flux Residue | TGA Analysis | 55% |

TABLE 2-continued

| | Test Method | Specification |
|---|---|---|
| Acid Value | IPC-TM-650 2.3.13 | 190-210 |
| Flux Residue Dryness | IPC-TM-650 2.4.47 | Pass |
| Spitting of Flux-Cored Solder | IPC-TM-650 2.4.48 | 0.3% |
| Solder Spread | IPC-TM-650 2.4.46 | 130 mm$^2$ |

SAC 305 solder consists of silver, copper and tin, with (potentially) some flux, silver chromate, corrosion, acids, etc. Silver, copper and tin are very low magnetic response metals and the flux, silver chromate, corrosion, acids, etc. are impurities. Consequently, as defined herein, SAC 305 solder is a very low magnetic response metal. It was unexpected prior to the present disclosure that the presence of a relatively weak magnetic field would have a dramatic and demonstrable effect on the solidification structure of this solder. However, such effects have been observed in the course of the preparation of this disclosure. In addition to varying the grain morphology in a manner that is likely to mitigate problems with tin whiskers, the shock and vibration tolerance of RoHS compliant solders may be enhanced with the use of magnetic fields, even relatively weak magnetic fields.

It has been further observed that the addition of alloying ingredients as well as second phase materials (which do not melt or only melt to a limited extent) may intensify the magnetic fields locally, and further affect and control the grain structure and other metallurgical properties. For example, elements that have ferromagnetic or magnetic properties may be added as second phase materials to a solder alloy in order to increase the strength, concentration, and alignment of relatively low magnetic fields to further enhance the properties described herein. However, even without the presence of such second phase materials, the presence of relatively low magnetic fields has been found to play an important role in the morphology of very low magnetic response metals in a solder alloy. Paramagnetic, ferromagnetic and diamagnetic materials present in the solder or in the soldered components generally will perturb the magnetic field and affect the resulting solder morphology, which in turn will generally affect mechanical behavior, the surface, chemical behavior characteristics, as well as the size, number, position and orientation of grains in the solder joint, as well as the eutectic and dendrite microstructure within the solder joint.

Techniques disclosed herein may provide a meaningful solution to many of the shortcomings of existing lead free solder systems, and may be applicable to almost any application of soldering, brazing, casting etc., that is governed by RoHS. Paramagnetic and diamagnetic properties of the metals in a fused metal solidification application are particularly useful in solder and brazing systems.

In addition to applications in soldering and brazing, relatively weak magnetic fields may be used to mitigate problems with grain sizes and orientation (as well as inter-granular and trans-granular defects) that occur in metal casting. The rate of nucleation and the direction of the solidifying front control the microstructure of a cast component. In the presence of a variable or stable magnetic field, the magnetic field may affect the solidification structure.

The application of stable or alternating electromagnetic fields of different frequencies and wavelengths may also be employed to provide unique and controllable effects in the morphology of electro-plated, electrolessly plated, and vapor-deposited metals. For example, relatively weak magnetic fields may be used to control the size and morphology of grains in plated materials produced by many electro-plating electroless plating systems. Typical problems encountered in such systems include "dog-boning," thick and thin spots, improper leveling, and other non-uniformities. The application of a magnetic field during a plating process may affect a plated metal grain structure, which directly affects the final finish properties and other plating characteristics. As another example, when tin is plated onto a surface, a magnetic field may be used to preferentially form a columnar grain microstructure, or preferentially preclude this grain microstructure. Using a moving magnetic field is expected to affect the plated surface microstructure differently than using a stable magnetic field. In addition, a field where the pole is parallel to the plane of the plated object is expected to produce a different structure than one produced where the pole is perpendicular to the plated surface.

Relatively weak magnetic fields may also be used to influence the properties of vapor deposited metals.

The application of magnetic fields with solder alloys may also be used as a simple and inexpensive method for visual identification of the type of solder alloy used in a particular process. For example, tin-bismuth on copper forms a distinctive crystal intermetallic structure when solidified in the presence of a relatively weak magnetic field, and is visibly distinguishable from SAC 305 or SnIC (tin-indium-copper) solder.

One or more relatively weak magnets may be built into a soldering station, holder, etc., and may aid in facilitating the assembly as well as affecting the joint morphology. As previously-noted, some materials are paramagnetic and some are diamagnetic, and these two properties may be used separately or in conjunction to aid in the assembly, to secure and hold (with magnetic force) the components for assembly. The resulting fields may also give rise to demonstrable effects within the solidified solder joint. However, it should be noted that structures within the electronic architecture such as part leads, component features, pins, etc., may affect even relatively weak magnetic fields that are applied to the system, and accordingly need to be accounted for in the design of magnetically enhanced fused metal applications.

One or more relatively weak magnets may be applied to a surface of a substrate being electrolytically plated, electrolessly plated, or vapor deposited with a metal, either opposite or adjacent a surface being plated. Such applications may be used to control the grain structure of the plated/deposited metal.

One or more relatively weak magnets may be built into a casting mold, such as a centrifugal caster. In a typical centrifugal caster the casting is slung in an arc and the metal flows into a casting mold by centrifugal force. There is generally a wall or a container that prevents any spilled metal from contacting the operator. Relatively weak magnets may be disposed on the wall of the container in a pattern of alternating N-S-N-S-N poles. As the casting swings in the arc near the wall of the container, the casting experiences the alternating magnetic fields as it is cast and solidified. Since the magnets are not in contact with the heated crucible or in proximity with the heat source for extended periods of time, this prevents the magnets from becoming over-heated, and the part is influenced by the relatively weak magnetic field until it is solid.

Figure 5:
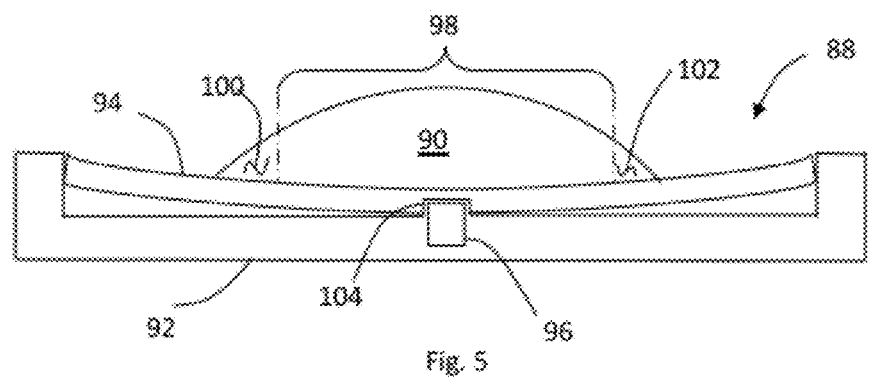
FIG. 5 is a somewhat schematic depiction of an apparatus for influencing the metallurgical properties of a fused metal.

FIG. 5 illustrates an apparatus 88 for influencing the metallurgical properties of a metal 90. The apparatus 88 includes a fixture 92 for supporting a plate 94. The plate 94 may be a circuit board, a metal substrate, a ceramic wafer, a bottom portion of a crucible or casting mold, or a similar structure. In the embodiment of FIG. 5 the plate 94 has a curved surface, but in other embodiments a plate 94 may have only flat surfaces. A magnet 96 is provided and is supported by the fixture 92. The apparatus 88 has a fusing region 98 of the plate 94. In the embodiment of FIG. 5, the portion of the metal 90 that is disposed on the plate 94 in the fusing region 98 is fused. In the embodiment of FIG. 5 the portions of the metal 90 that are outside the fusing region 98, such as portions 100 and 102, are solid.

An energy source is typically provided to establish and/or maintain the metal 90 in a fused state in the fusing region 98. In embodiments involving molten metal (such as soldering, welding, brazing, casting, and vapor deposition processes) the energy source is a heat source. In embodiments involving metals that are in a fluid-like state other than molten (such as powdered metal that is being sintered, and metal that is in a mushy state, and an electro-plating metal, an electrolessly plating metal, or metal that is being vapor-deposited) the energy source may be other than a heat source. For example, in electroplating the energy source is typically an electric current. In electroless plating the energy source is typically an oxidation/reduction chemical potential.

In the embodiment of FIG. 5 a port 104 is formed as a recess in the plate 94 and the magnet 96 is disposed in the port 104 such that the magnet 96 may be positioned close to the fusing region 98. In other embodiments a port in a plate may be formed as a through-hole in the plate. Some embodiments do not employ a port.

Soldering Examples

Figure 6A:
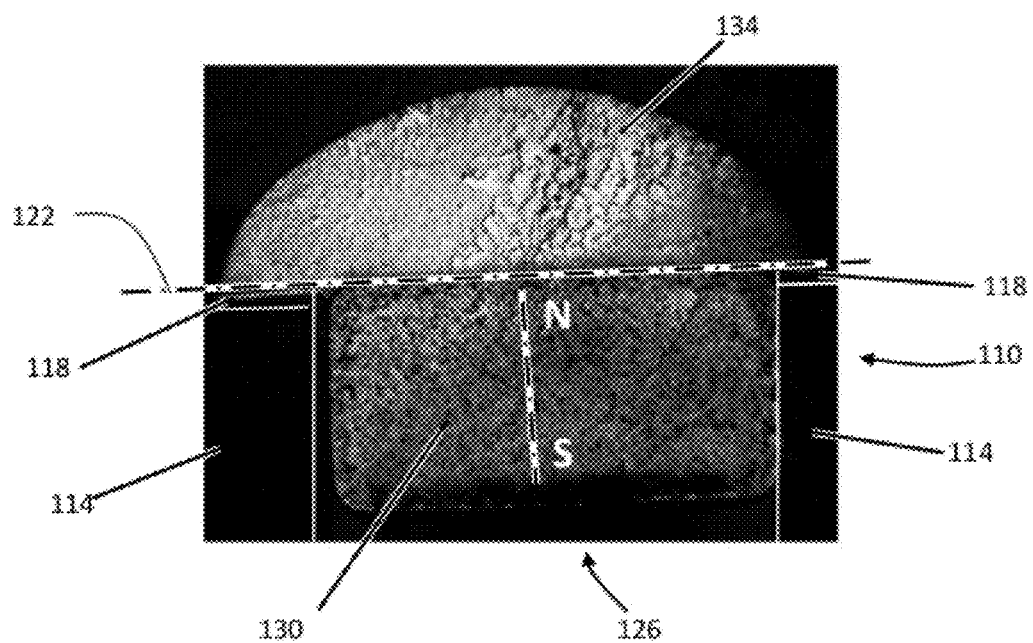
FIG. 6A is a photomicrograph of a cross section of a magnet and a solder cap.
Figure 6B:
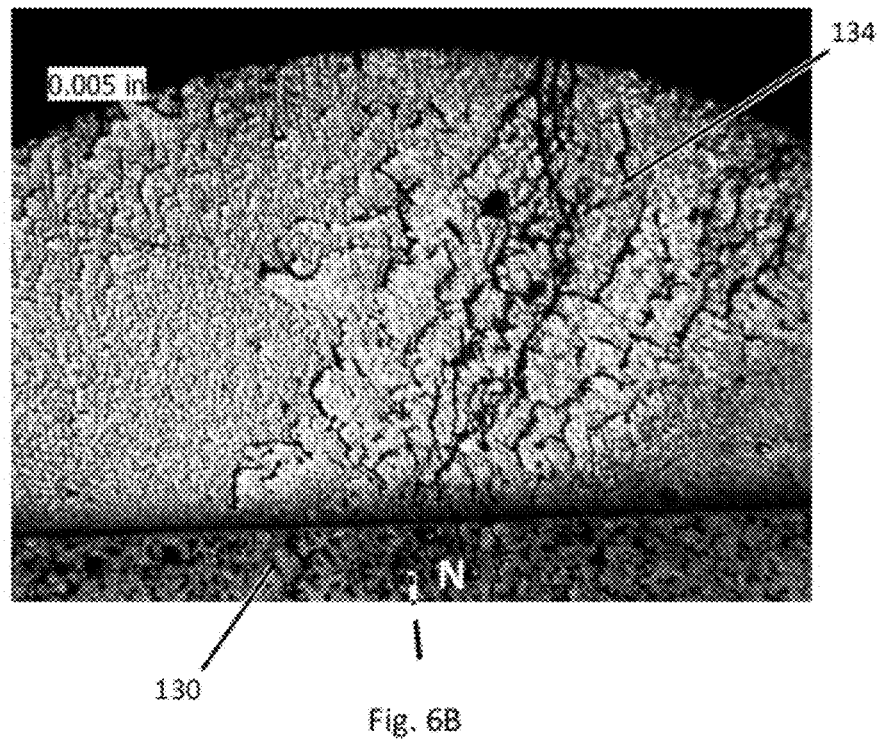
FIG. 6B is a magnification of a portion of the photomicrograph of FIG. 6A.

The application of small localized magnets may produce large effects such as those shown in the example solder joints pictured in FIGS. 6A, 6B, 7A and 7B. FIGS. 6A and 6B illustrate a first example of the influence of a relatively weak magnetic field on the morphology of a soldered cap applied over a copper pad surrounding a through-hole in a printed circuit board 110. The term "solder cap" as used herein refers to any of various soldering structures such as a solder bridge, a soldered joint, a soldered connection, a soldered coating (such as a solder "tinning" structure), and similar solder structures. FIG. 6A is a cross section through the thickness of the printed circuit board 110. The printed circuit board 110 has a substrate 114 and a first copper pad 118. The broad surface of the printed circuit board 110 establishes a plane 122 of the printed circuit board 110. There is a first through-hole 126 that passes through the substrate 114 and the first copper pad 118 of the printed circuit board 110. A first relatively weak magnet 130 is disposed in the through-hole 126 such that the top surface of the first relatively weak magnet 130 is disposed substantially flush with the top of the first copper pad 118. The first relatively weak magnet 130 is a circular cylindrical magnet that has been sectioned through the major axis of the cylinder. As illustrated in FIG. 6A, the poles of the first relatively weak magnet 130 are oriented generally along the axis of the through-hole 126 with the north pole of the first relatively weak magnet 130 being upward. This corresponds to the "A" orientation magnetic field previously described with respect to first magnetic field 22 depicted in FIG. 1. A first solder cap 134 has been formed over the first relatively weak magnet 130 and over portions of the first copper pad 118, bridging the first through-hole 126 within which the first relatively weak magnet 130 is disposed.

FIG. 6B is a magnification of a portion of FIG. 6A. Note the modification of the morphology of the first solder cap 134 in the direction projected from the orientation of the poles of the first relatively weak magnet 130.

Figure 7A:
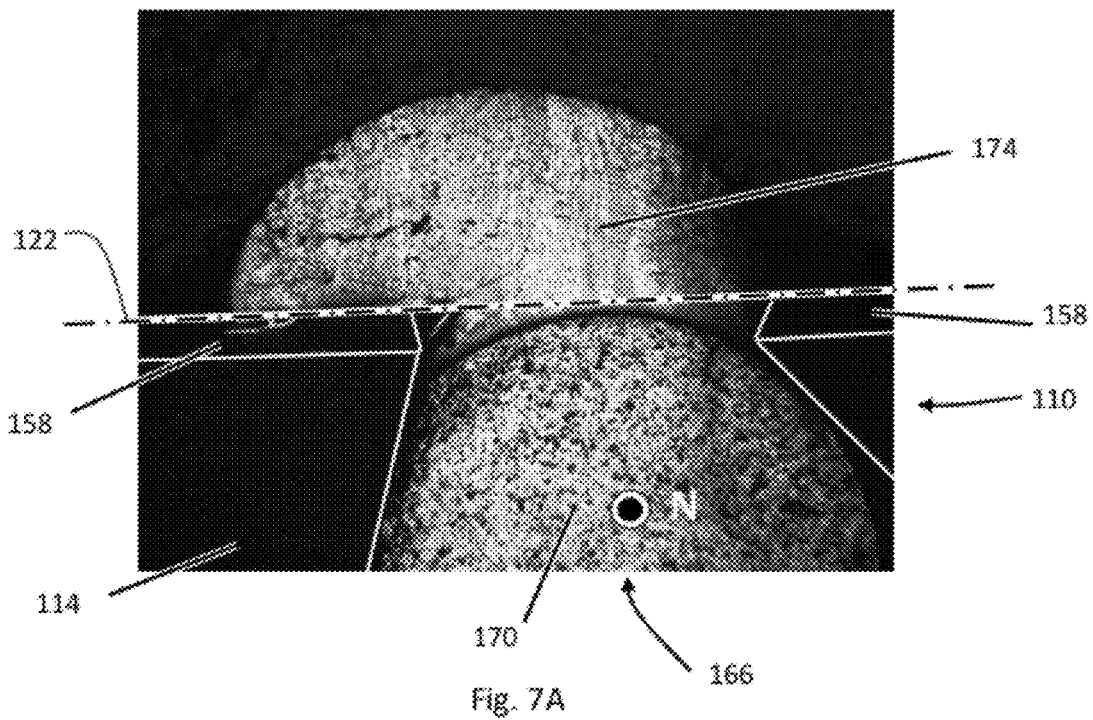
FIG. 7A is a photomicrograph of a cross section of a magnet and a solder cap.
Figure 7B:
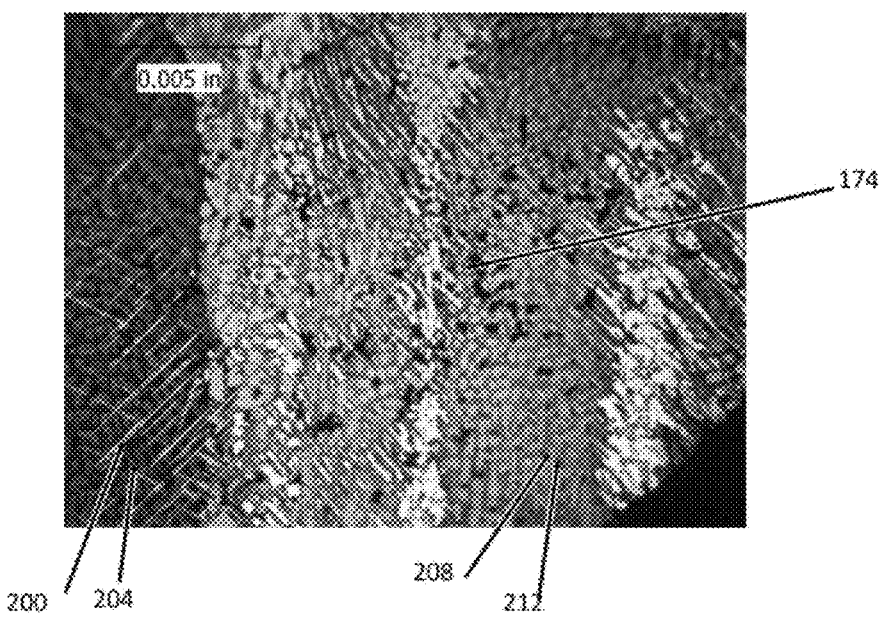
FIG. 7B is a magnification of an inverted portion of the photomicrograph of FIG. 7A.

FIGS. 7A and 7B illustrate a second example of the influence of a relatively weak magnetic field on the morphology of a soldered cap applied over a copper pad surrounding a through-hole in the printed circuit board 110. FIG. 7A is a cross section through the thickness of the printed circuit board 110 as shown in FIGS. 6A and 6B, at the location of a second through-hole 166 that passes through the substrate 114 and a second copper pad 158 of the printed circuit board 110. A second relatively weak magnet 170 is disposed in the second through-hole 166 such that the poles of the second relatively weak magnet 170 are oriented generally perpendicular to the axis of the second through-hole 166 and parallel with the plane 122 of the printed circuit board 110, with the north pole of the second relatively weak magnet 170 being outward from the page toward the viewer. This corresponds to the "B" orientation (which is equivalent in this instance to the "C" orientation) magnetic field previously described with respect to second magnetic field 30 (and equivalently third magnetic field 34) depicted in FIG. 1. A second solder cap 174 has been formed over the second relatively weak magnet 170 and over portions of the second copper pad 158, bridging the second through-hole 166 within which the second relatively weak magnet 170 is disposed.

FIG. 7B is a magnified but inverted portion of FIG. 7A. Note the various features 200, 204, 208, and 212 of the morphology of the second solder cap 174. For example, features 200 and 204 combine to depict an oriented phase having a herringbone pattern appearance. Feature 208 is one of many dendritic phases (oriented into the page) that are adjacent an inter-dendritic phase, such as feature 212. Features 200, 204, 208, and 212 are formed when lead-free solder solidifies in the presence of a stable relatively weak magnetic field.

Many solder joints have been formed using various stable (i.e., stationary and constant flux) magnetic fields and using various variable (moving [including rotating] and/or variable flux) magnetic fields. The results have shown that even with a relatively weak magnetic field it is possible to make predictable and repeatable changes to the grain structure of the solidified solder joint. In some cases the samples were resistant to chemical etching when exposed to 10% HCl, 90% Methanol etchant.

In some systems where the solder alloy and thermal conditions might be expected to yield a columnar morphology, the application of relatively weak magnetic fields produced structures that were: 1) columnar, 2) random, 3) fine grain, 4) spherical, 5) spherical with dendritic sublatice, etc. Since columnar microstructures in lead-free solder is generally thought to be a source of formation of "tin whiskers," the ability to minimize the production of columnar microstructures may reduce the formation of tin whiskers. These alternative structures were controlled by the application of a small hand held magnet or a small rotating magnet of a laboratory magnetic stirring device. Any magnetic field such as an electromagnet, inductor, pulsed field etc. may be used; however, the use of small hand held magnets for this type of application is generally sufficient.

In another specific evaluation, optical microscopy (reflected polarized light microscopy, RLM), scanning electron microscopy (SEM) with associated energy dispersive spectrometry (EDS), and x-ray diffraction (XRD) were used to characterize the samples of tin solder. The nominal composition of the tin solder was 96.5 percent tin, 3.0 percent silver, and 0.5 percent copper.

Beads of three samples were embedded in epoxy and cut using a thin bladed wafer saw. The beads were cut parallel to the bottom of the bead (horizontal samples) and perpendicular to the bottom of the bead (vertical samples). This produced two sets of orientations at right angles to each other. After the embedded samples were cut, the sample mounts were ground using 0.3 micrometer alumina powder on a vibrating table. The sample mounts were then polished by hand on 1 micrometer alumina powder followed by 0.3 micrometer alumina powder. The hand polishing was necessary because, although the vibrating table flattened the mounts, it also smeared the tin on the surface. Several etchants were tried on the mounts, but the one chosen was 1 part HCl, 47.5 parts ethanol, and 2.5 parts H2O. After etching, the samples were examined by reflected light optical microscopy, carbon coated, and then characterized by scanning electron microscopy (SEM). After SEM characterization, the mounts were re-polished and then examined by polarized reflected light optical microscopy.

All three samples showed evidence of tin dendrites forming a skeleton of grains with interstices. The dendrites are tin while the bulk composition of the interstices are tin with minor silver content and trace copper content. The interstices contain silver grains and copper grains surrounded by tin. Some small areas of tin were not as etched as most of the tin areas. The degree of etching of the tin was seen to be dependent upon the crystal orientation.

A specimen designated as "Sample A" provided solder cap structures formed on a printed circuit board where the solder solidified in the presence of a relatively weak magnetic field where the poles of the relatively weak magnet were perpendicular to the plane of the printed circuit board (the "A" orientation as described previously herein with respect to FIGS. 6A and 6B). In Sample A the grain size was found to be approximately 200 to 1000 micrometers in the horizontal mount view and 200 to 300 in the vertical mount view. The proportions of dendrite to interstice were higher in the vertical mount view than in the horizontal mount view.

A specimen designated as "Sample 0" provided control solder cap structures where the solder solidified with no external magnetic field present (except for nominal ambient magnetic fields such as the earth's magnetic field). As compared to Sample A the grain sizes in Sample 0 were much larger (1 to 4 millimeters) and there was no significant difference in appearance between the horizontal and vertical mounts.

A specimen designated as "Sample 10" provided solder cap structures formed in the presence of a rotating relatively weak magnetic field produced by a laboratory magnetic stirring apparatus rotating parallel to the printed circuit board (the "Z" orientation and described previously herein with respect to FIG. 2). As compared to Sample A the grain sizes in Sample 10 were much larger (1 to 4 millimeters) and there was no significant difference in appearance between the horizontal and vertical mounts.

In addition, associated energy dispersive spectrometry (EDS) analysis of Samples A and 10 indicated significantly higher Cu peaks than in Sample 0.

These results indicated an ability to (1) affect chemical reactivity, (2) control grain characteristics (size, structure, orientation, and distribution), (3) affect wetability and contact angle, and (4) affect appearance. Such effects may inhibit residual stress, reduce or eliminate a tendency of lead-free solders to form tin whiskers, improve mechanical properties, and decrease sensitivity of materials to shock and vibration.

Figure 8:
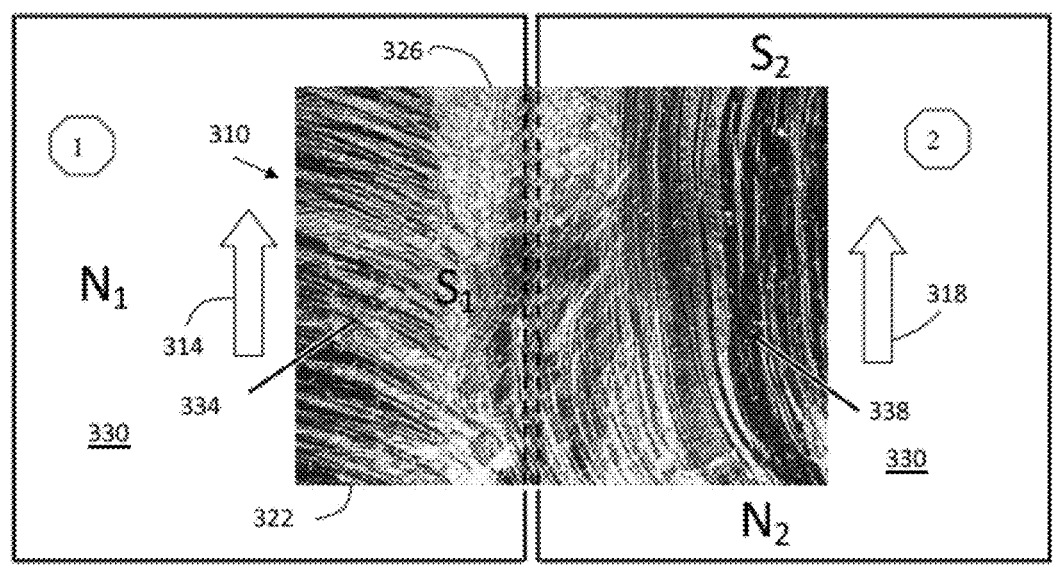
FIG. 8 is a photomicrograph of a cross section of a solder metal deposit formed using a soldering iron to flow SAC 305 solder.

FIG. 8 illustrates a further soldering example. A soldering iron was used to flow SAC 305 solder across a printed circuit board, to form a solder metal deposit. A 100X magnification photomicrograph of a surface 310 of the solder metal deposit is depicted. The surface 310 is parallel to the surface of the circuit board, so FIG. 8 is a top-view image. The direction of motion of the soldering iron is depicted by arrows 314 and 318. A relatively weak magnet 330 was positioned as indicted by octagon number 1 in FIG. 8, with the North and South poles of the relatively weak magnet 330 being positioned and oriented as indicated by "$N_1$" and "$S_1$." Molten solder was flowed over the surface 310 on the left portion of the image of FIG. 8, moving the soldering iron from the bottom 322 up to the top 326 of the surface 310. This corresponds to the "B" orientation previously described with respect to magnetic field 30 depicted in FIG. 1. First microscopic features 334 were formed that are oriented generally perpendicular to direction of motion 314 of the soldering iron. Then the relatively weak magnet 330 was rotated 90° counterclockwise and moved to the right side of FIG. 8 as indicted by octagon number 2, with the North and South poles orientated as indicated by "$N_2$" and "$S_2$." Molten solder was flowed over the surface 310 on the right portion of the image of FIG. 8, moving the soldering iron from the bottom 322 up to the top 326 of the surface 310. The second microscopic features 338 that were formed are oriented generally parallel to the direction of the arrow 318 representing the direction of motion of the soldering iron.

FIG. 9 illustrates effects of reflowing solder under the influence of a relatively weak magnetic field. A 300X magnification photomicrograph of a surface 410 of a solder metal deposit is depicted. The solder metal deposit was initially formed with the same process described with respect to FIG. 8, and surface 410 has same orientation (top view) and process orientation (solder flow from bottom to top) as surface 310 of FIG. 8. A left portion 414 of the surface 410 represents a portion of the solder metal deposit as initially formed directly over the relatively weak magnet 418. Microscopic features 422 are generally aligned with the N/S pole axis of the relatively weak magnet 418. Star-shaped "puckers" 426 are evident. A right portion 430 of the surface 410 represents a region where the solder metal deposit was reflowed (re-melted) without changing the orientation of the relatively weak magnet 418. Microscopic features 434 in the right portion 430 are somewhat more accurately aligned with the axis of the relatively weak magnet 418 after reflow. Star-shaped "puckers" 438 are also evident in the right portion 430.

FIG. 9A presents a magnified view of a portion of the left portion 414 of the surface 410 depicted in FIG. 9.

FIGS. 10A and 10B illustrate further soldering examples. A soldering iron was used to flow SAC 305 solder across a through-hole in a printed circuit board, to form a solder metal deposit. FIGS. 10A and 10B each depict a 1000X magnification photomicrograph of a surface of a solder metal deposit that is taken parallel to the surface of the circuit board, so the FIGS. 10A and 10B are a top-view image. In forming the solder metal deposit depicted in FIG. 10A no magnetic treatment was applied as the solder metal deposit was formed. Microscopic features in this photomicrograph are substantially randomly oriented. In forming the solder metal deposit depicted in FIG. 10B, a relatively weak magnet was disposed under the solder metal deposit as it was formed, with the North poles of the relatively weak magnet oriented such that it is perpendicular to the plane of the image, as indicated. This corresponds to the "A" orientation previously described with respect to the first magnetic field 22 depicted in FIG. 1. The photomicrograph illustrates the ends of microstructures that are oriented perpendicular to the plane of the image.

Figures 11A, 11B, 11C:
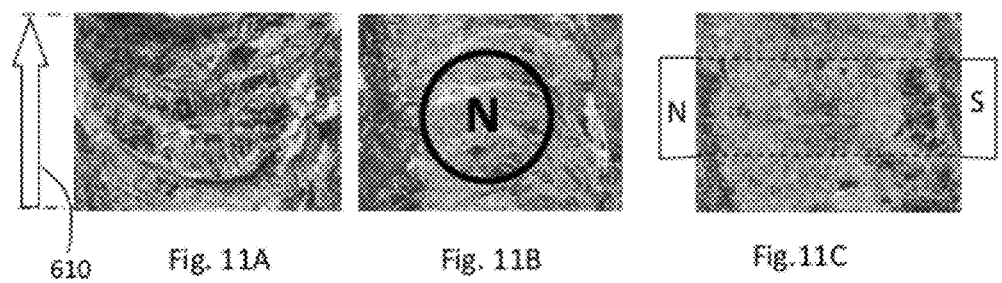
FIGS. 11A-11C are photomicrographs of cross sections of solder metal deposits formed using a laser.

FIGS. 11A, 11B, and 11C illustrate further soldering examples. A laser was used to flow SAC 305 solder across a through-hole in a printed circuit board, to form a solder metal deposit. The solder metal deposits depicted in FIGS. 11A, 11B, and 11C were all prepared using the process depicted in (and described herein with reference to) FIG. 8, except that a laser was used in place of a soldering iron. Each of these Figures depicts a 500X magnification photomicrograph of a surface of a solder metal deposit that is taken parallel to the surface of the circuit board, so the figures present top-view images. The laser moved in a linear path along direction 610. In forming the solder metal deposit depicted in FIG. 11A, no magnetic treatment was applied as the solder metal deposit was formed. In forming the solder metal deposit depicted in FIG. 11B a relatively weak magnet was disposed under the solder metal deposit as it was formed, with the North poles of the relatively weak magnet oriented such that it is perpendicular to the plane of the image, as indicated. This corresponds to the "A" orientation previously described with respect to the first magnetic field 22 depicted in FIG. 1. In forming the solder metal deposit depicted in FIG. 11C, a relatively weak magnet was disposed underneath the portion of the solder metal deposit in the orientation indicated. This corresponds to the "B" orientation previously described with respect to magnetic field 30 depicted in FIG. 1. No significant differences are observed between the three processes. Without being bound by any scientific theory, it is considered likely that this can be attributed to the very fast melting/solidifying nature of laser processing compared with soldering iron processing, where with the laser process the very fast melting/solidifying process did not provide sufficient time for microstructures to align while in the molten state.

Plating Examples

Figure 12:
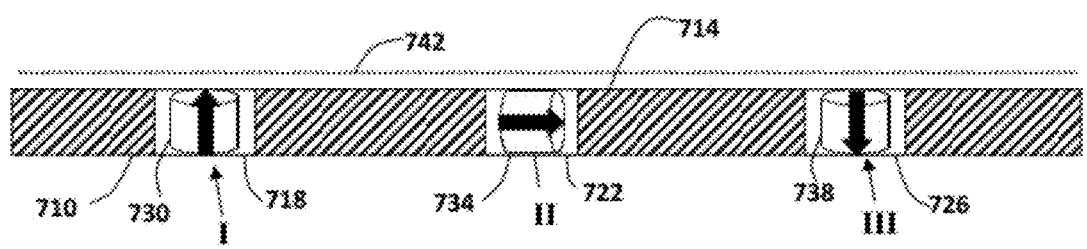
FIG. 12 is a schematic illustration of a setup for electroplating under the influence of relatively weak magnetic fields.

It has also been demonstrated that relatively weak magnetic fields may be used to affect deposition, orientation and plating morphology with effects that typically depend on the plating chemistry and applied currents and fields. FIG. 12 presents a schematic illustration of a setup that was used for electro-plating tin on a copper metal substrate 710. The substrate 710 has a planar surface 714. Three through-holes 718, 722, and 726 were drilled through the substrate 710. A first relatively weak magnet 730 was placed in the first through-hole 718, a second relatively weak magnet 734 was placed in the second through-hole 722, and a third relatively weak magnet 738 was placed in the third through-hole 726. The magnets 730, 734, and 738 were cemented in the substrate 710 such that the planar surface 714 was smooth over the magnets. The orientation "I" of the North/South poles of the first relatively weak magnet 730 was perpendicular to the planar surface 714; the orientation "II" of the North/South poles of the second relatively weak magnet 734 was parallel to the planar surface 714; and the orientation "III" of the third relatively weak magnet 738 was perpendicular to the planar surface 714. Note that orientations I and III are in opposite directions, with the North pole being up in one orientation and down in the other orientation. These orientations "I" and "III" are analogous to orientations "A" described with respect to the first magnetic field 22 in FIG. 1. Which orientation ("I" or "III") had North up and which had North down was not recorded for this test. Orientation II is analogous to orientations "B" and "C" described with respect to magnetic fields 30 and 34 of FIG. 1. A layer of tin plating 742 was electro-plated on the planar surface 714.

FIGS. 13A-13F are 200X magnification photomicrographs of cross sections of portions of the substrate 710 that is schematically depicted in FIG. 12, after electroplating the layer of tin plating 742. The thickness of the layer of tin plating 742 at each portion is annotated numerically in FIGS. 13A-13E (e.g., "0.0019 in" in FIG. 13A).

Figure 13A:
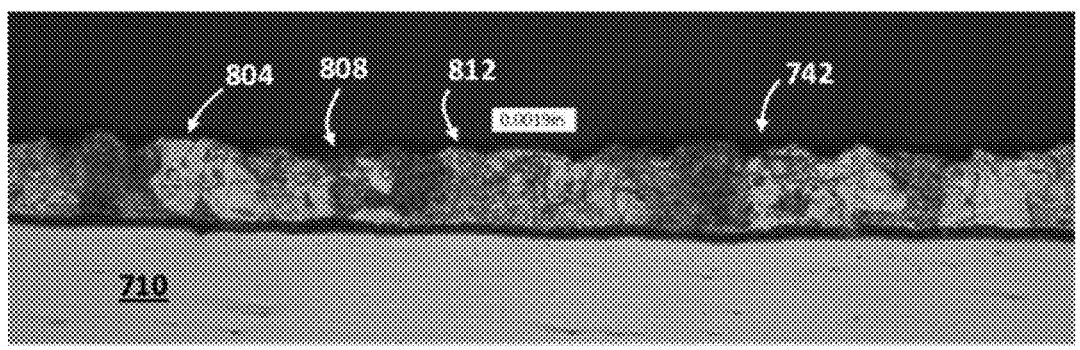
FIGS. 13A-13F are photomicrographs of various cross sections of plated material using the setup of FIG. 12.

The portion of the substrate 710 and the tin plating 742 that is depicted in FIG. 13A is in a region that is left of the first through-hole 718, and, it is believed, beyond the range of influence of the first relatively weak magnet 730. Individual grains such as grains 804, 808, and 812 of the tin plating 742 are visible, and the grains 804, 808 and 812 are generally irregular in shape with irregular grain boundaries.

Figure 13B:
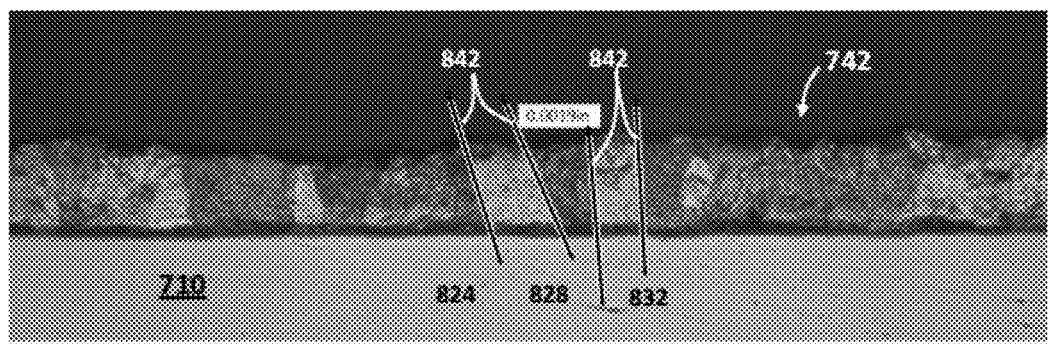

The portion of the substrate 710 and the tin plating 742 that is depicted in FIG. 13B is in a region over the first through-hole 718 and the first relatively weak magnet 730. Individual grains of the tin plating 742 such as grains 824, 828 and 832 are visible and, quite unexpectedly, the grains 824, 828, and 832 have substantially columnar grain boundaries 842. It is believed that the development of these substantially columnar grain boundaries 842 was promoted by the first relatively weak magnet 730 in orientation "I." The ability to produce columnar grain structures in plating processes by using a relatively weak magnetic field, such as that produced by the first relatively weak magnet 730 in orientation "I" is a useful tool.

Figure 13C:
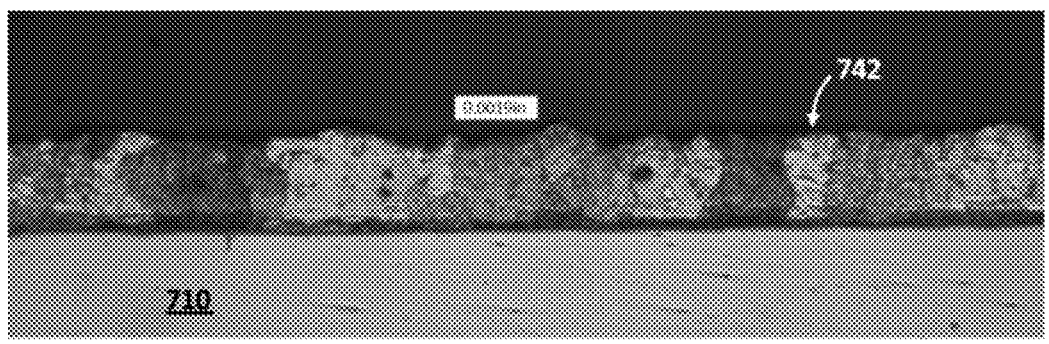

The portion of the substrate 710 and the tin plating 742 that is depicted in FIG. 13C is in a region that is between the first through-hole 718 and the second through-hole 722. It is believed that this region is beyond the range of influence of the first relatively weak magnet 730 or the second relatively weak magnet 734. Individual grains of the tin plating 742 are visible, and the grains are generally irregular in shape with irregular grain boundaries.

Figure 13D:
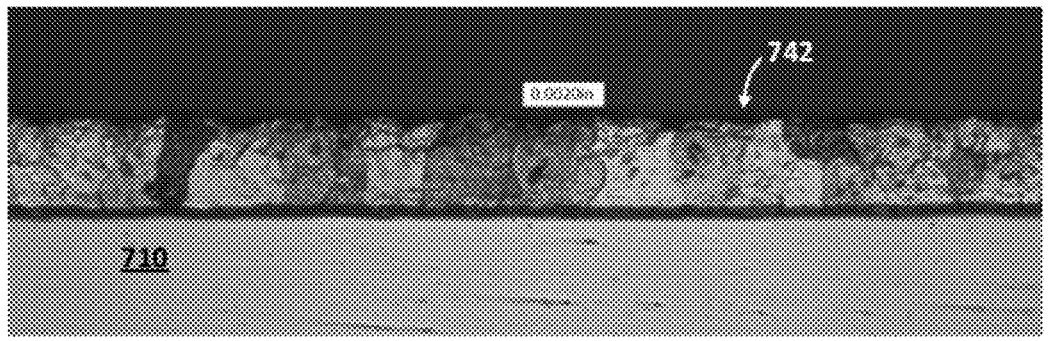

The portion of the substrate 710 and the tin plating 742 that is depicted in FIG. 13D is in a region over the second through-hole 722 and the second relatively weak magnet 734. Individual grains of the tin plating are visible, and the grains are generally irregular in shape with irregular grain boundaries, similar to those in FIGS. 13A and 13C. It appears that the second relatively weak magnet 734 in orientation "II" had a different influence on the grain structure of the tin plating 742 in that region. The second relatively weak magnet 734 may have changed the columnar grains from perpendicular to parallel to the substrate 710.

Figure 13E:
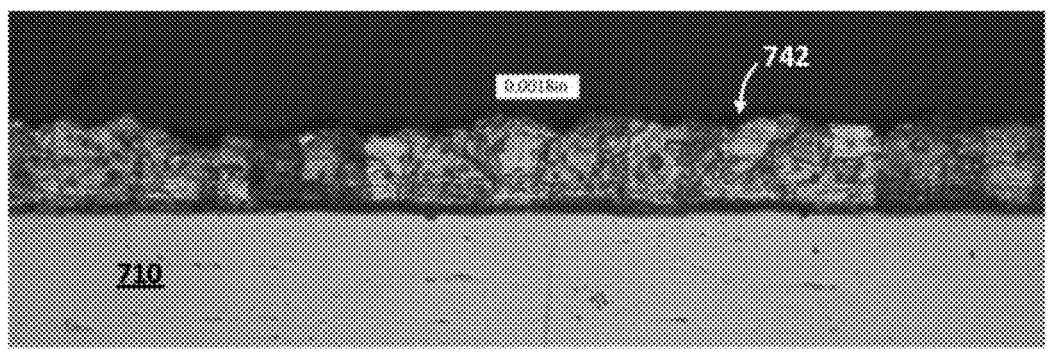

The portion of the substrate 710 and the tin plating 742 that is depicted in FIG. 13E is in a region that is between the second through-hole 722 and the third through-hole 726. It is believed that this region is beyond the range of influence of the second relatively weak magnet 734 or the third relatively weak magnet 738. Individual grains of the tin plating 742 are visible, and the grains are generally irregular in shape with irregular grain boundaries.

Figure 13F:
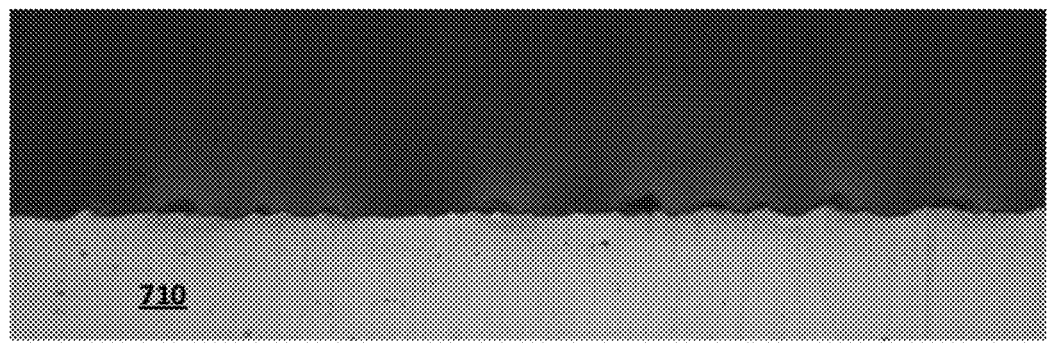

The portion of the substrate 710 and the tin plating 742 that is depicted in FIG. 13F is in a region over the third through-hole 726 and the third relatively weak magnet 738. Quite unexpectedly, no tin plating occurred in this region. It is believed that tin plating was inhibited by the third relatively weak magnet 738 in orientation "III." The ability to selectively inhibit plating using a relatively weak magnetic field, without other masking, is a useful tool.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of prospective claims when interpreted in accordance with the breadth to which they are fairly, legally, and equitably entitled.

What is claimed is:

1. A method of controlling metal whiskers in lead-free solders, the method comprising:
    exposing a low magnetic response fused metal including tin based molten lead-free solder to a magnetic field;
    solidifying the molten lead-free solder in the presence of the magnetic field, the molten lead-free solder forming a grain structure during solidification; and controlling an orientation of the grain structure of the lead-free solder during solidification based at least in part on an orientation of the magnetic field.

2. The method of claim 1 wherein the controlling step includes preventing columnar microstructures in the grain structure.

3. The method of claim 1 wherein the magnetic field is exposed to a rotating magnetic field during solidification.

4. The method of claim 1 wherein the lead free solder has a magnetic molar susceptibility ($c_m/10^{-6}cm^3-mol^{-1}$) up to 1000.

5. The method of claim 1 wherein the magnetic field is provided by a magnet having a field strength at its surface in a range from between 0.2 Tesla and 1.5 Tesla.

6. The method of claim 1 wherein the magnetic field has a field strength at a point of application to the lead-free solder that is in a range from between 0.2Tesla and 1.5 Tesla.

7. The method of claim 1 wherein the magnetic field is provided by a magnet comprising a strongest magnetic material, where the strongest magnetic material has a maximum energy product ($BH_{max}$) that is in a range between 5 Million Gauss Oersted (MGOe) and 50 MGOe.

8. The method of claim 1 wherein the magnetic field has a field strength at a point of application to the fused metal that is in a range from between 0.2 Tesla and 1.5 Tesla.

9. A method of influencing a metallurgical property of lead-free solders, the method comprising:

exposing a molten lead-free solder to a magnetic field, the lead-free solder alloy consisting essentially of low magnetic response fused metals selected from the group consisting of tin, bismuth, indium, copper, silver, antimony, zinc, and cadmium;

solidifying the molten lead-free solder in the presence of the magnetic field, the molten lead-free solder forming a grain structure during solidification; and controlling an orientation of the grain structure of the lead-free solder during solidification based at least in part on an orientation of the magnetic field.

10. The method of claim 9 wherein the controlling step includes preventing columnar microstructures in the grain structure.

11. The method of claim 9 wherein the magnetic field is exposed to a rotating magnetic field during solidification.

12. The method of claim 9 wherein the lead free solder has a magnetic molar susceptibility ($c_m/10^{-6}cm^3-mol^{-1}$) up to 1000.

13. The method of claim 9 wherein the magnetic field is provided by a magnet having a field strength at its surface in a range from between 0.2 Tesla and 1.5 Tesla.

* * * * *